United States Patent [19]

Babo

[11] 4,333,266
[45] Jun. 8, 1982

[54] VITICULTURAL PROCESS AND VINE-DRESSING MACHINE

[76] Inventor: Tivadar Babo, Borkombinat, 6344 Hajos-Hild, Hungary

[21] Appl. No.: 119,820

[22] Filed: Feb. 8, 1980

Related U.S. Application Data

[63] Continuation of Ser. No. 913, Dec. 27, 1978, abandoned, which is a continuation of Ser. No. 843,961, Oct. 20, 1977, abandoned.

[51] Int. Cl.³ ............................................. A01G 17/02
[52] U.S. Cl. ............................................. 47/58; 47/46
[58] Field of Search ..................................... 47/58, 46

[56] References Cited

U.S. PATENT DOCUMENTS

| | | | |
|---|---|---|---|
| 2,940,486 | 6/1960 | Whitmore | 47/1 X |
| 2,977,715 | 4/1961 | Lindsay | 47/1.7 |
| 3,330,068 | 7/1967 | Carson | 47/1 |
| 3,380,236 | 4/1968 | Shepardson | 56/330 |
| 3,435,600 | 4/1969 | Tickle | 56/237 |
| 3,606,741 | 9/1971 | Olmo et al. | 56/330 X |

FOREIGN PATENT DOCUMENTS

| | | | |
|---|---|---|---|
| 837328 | 2/1939 | France | 47/1.7 |
| 2230285 | 12/1974 | France | 56/235 |
| 430823 | 7/1975 | U.S.S.R. | 56/237 |

OTHER PUBLICATIONS

General Viticulture, Winkler et al., 1974, Univ. of Calif. Press, Berkeley, pp. 312, 313, 329–330.
Grape Growing, Weaver, 1977, John Wiley & Sons, N.Y. pp. 207–208.

Primary Examiner—Robert E. Bagwill
Attorney, Agent, or Firm—Gabriel P. Katona

[57] ABSTRACT

Viticultural process with which manual vine dressing or pruning during vine growing can be eliminated. Producing twigs are cultivated from the hanging vine shoots, the twigs having short sprouts, while producing twigs are cut back to eliminate periodicity. Alternatively or additionally, known chemical growth retardants are employed, mainly on the buds and the blossoms. The vine-dressing machine has at least one dressing mechanism on an arm that can be rotated and tilted in addition to being adjustable in height. When of a mechanical construction, the dressing mechanism may include a circular saw or blade for shortening or cutting back the already formed vine shoots, producing twigs and/or other vine parts that need to be spaced apart. The dressing mechanism may also be constituted by a spraying or pulvering attachment with conduits for applying the chemicals that impede or retard budding, and/or to retard blossom growth.

6 Claims, 10 Drawing Figures

VITICULTURAL PROCESS AND VINE-DRESSING MACHINE

This is a continuation of Ser. No. 913, filed Dec. 27, 1978 which is continuation of Ser. No. 843,961, filed Oct. 20, 1977.

The agrotechnical, more specifically viticultural process according to the invention relates to a vine growing method by the application of which manual vine dressing and pruning as such can be eliminated. The process does not preclude, however, the possibility of carrying out from case to case vine dressing by hand.

It is well known that it was already possible to mechanize all operations occurring in vine growing; recently even harvesting devices have been developed that are acceptable for vintage. However, no machine could be developed so far that would entirely exclude manual work for vine dressing in winter. This deficiency in mechanization maintains essentially the labor intensity of viticulture as such, nearly at the earlier level of development, since in estates having large vine lands a well qualified, and numerous, staff has to be employed for carrying out periodical manual work although the worktime of this staff is not sufficiently utilized throughout the rest of the year.

The problems have induced research workers to investigate in more detail the possibility of vine growing without dressing. It is known that vine varieties growing wild in the forests as well as vine varieties that ran wild always come up, if possible from the buds of the highest positions, due to their high light demand and highly polar nature. The shoots climb up unto the branches of nearby trees or shrubs. If the vine stock cannot sufficiently claw upwards at the crowns of the trees, the shoots will bow down vertically under the weight of their clusters of grapes and under their own weights. Thereby the vine has rendered itself bearing.

After growing for several years without dressing, the sprouts become ripe on short sections, under suitable light conditions, which have already been produced on the hanging vine shoots without any dressing; these shoots can thus be considered producing twigs. Underneath the upper sprouts, the lower ones usually open and yield vintage.

Vintage quantities and shoot yields of vine stocks are, however, highly variable without regular dressing. In the development of the fluctuation, primarily environmental factors play a decisive part, e.g. winter frost. In case of a small vintage in a year when the vine stock is not sufficiently producing, sprouts grow longer, ripening is better, and the must grade is higher. Under the effect of a rich vintage in a year when the vine stock produces spontaneously a large quantity of vintage, sprout growth and ripening fall back, and blossoms are pulverized (masculinization).

The vegetative and generative activities of vine cultivated without dressing show a special harmony. This condition is termed physiological equilibrium.

Setting-in of the physiological equilibrium may be disturbed by environmental factors. Under their effects, vine stocks will only produce periodically. The values characterizing the physiological equilibrium (average length of ripened shoots, must grade, etc.) can be calculated from the averages of the years when the vine stock is not sufficiently producing, and of those when it is producing spontaneously.

Investigations proved that it is indispensable to regulate the vegetative and generative activities.

Mechanical regulation, or by means of chemical agents, of the vegetative and generative activities requires the building of a support system of a novel type. It is one of the important requirements for a good support system that free cutting back of the shoots be made possible.

As compared to the known support system of the farm Lenz-Moser, some changes have to be accomplished for the sake of the invention. There is only one horizontal wire in the support system that carries a cordon arm and the total weight of the stock. The posts of the support system bear the horizontal wire. Such systems according to the "G.D.C." and "Duplex" plantations are also suitable for mechanical vine dressing. In the vineyard the cordon arm preferably reaches from stock to stock. The height of the stock stem is cultivated up to 140 to 220 centimeters depending on the distance of the lines and of the stocks, on the vegetational possibilities of these stocks, and on their kinds or breeds. On the cordon arm, long sprouts are cultivated in the first (and possibly the second) year. The sprouts mostly sag downwards in a curved fashion under the weight of the vintage and the sprouts, after their initial upward growth, usually from the middle of the summer on. In the next year the vine stocks become producing.

When this occurs, the shoots are spaced out to a distance of about 15 to 30 cm from each other along the cordon arm. Suitably, a distance of about 20 cm between the sprouts may be ensured on the cordon arm by bud thinning. After budding, even the upright vine shoots assume a hanging position, being forced to do so by the sprouts and the amount of the vintage. On the vine stocks, the load and the number of growth poles increases. The sprouts do not grow long. The sprouts on the uppermost points of the curved sections of the downward hanging shoots, mostly grown from the first light buds, will be riper than those located beneath them, and strengthen toward the end of summer due to their polarly advantageous position, and also on account of the ample light supply. The sprouts grown from the buds that are nearest to the ground, and from the middle buds of the downward bending shoots, will hardly ripen by autumn, or only in a short section, due to their more unfavorable polar positions and to the large vintage quantity.

During the regulation of the vegetative—generative activity the already produced shoots, namely the producing twigs, will be cut short to the required extent. (After several years, the already produced shoots are called producing twigs whereas under cutting short or back one understands the cutting of the sections, towards the ground, of the already produced vine shoots, producing twigs, and the throttling of the vintage yield.)

The already produced vine shoots, or producing twigs, can be cut short manually or mechanically.

The dressing by means of a machine can be carried out mechanically by cutting back the already produced vine shoots, producing twigs, or by impeding the budding on the sections above ground of the already produced vine shoots by means of chemical agents, or of the producing twigs, or by spacing out the blossoms and the vintage, and finally by regulating the vintage by means of chemical agents.

It is one of the major objects of the invention to eliminate the drawbacks and deficiencies of the known vine-growing methods, allowing to dispense with any manual dressing, facilitating mechanical dressing, increasing the average yield, and reducing manual labor requirements.

For this purpose, it is expedient, according to the invention, to cultivate the producing twigs that have short sprouts from the hanging vine shoots. The task of mechanical dressing is in such cases mainly the cutting back of the producing twigs to the required extent, so as to eliminate periodicity, in the interest of higher vintage quality.

According to the invention, the yield and quality of the vintage, the shoot yield, as well as the required equilibrium condition can be taken care of by mechanical dressing on the vine stocks that are cultivated on the simplified inventive support system.

The essence of the inventive viticultural process consists in that (in the vine rows) a wire holding the cordon arm is used, to be considered as a single wire in respect of its function, parallel to the stock line, and preferably at a height of 140 to 220 cm. Long shoots are cultivated on the cordon arm at a distance of 10 to 30 cm from each other. After the cultivation of the vine stock, the hanging, already produced vine shoots, the producing twigs, as well as other parts, e.g. the poorly developed and unripe parts, are cut short, preferably by mechanical dressing.

According to the inventive process, the yearly loading of the vine stock is adjusted by the extent of cutting short the already produced vine shoots or producing twigs.

In accordance with the invention, the propagation of the vine stock in the horizontal direction is regulated by the length of the cordon arm and by the number of the producing bases.

The number of such bases can also be ensured by using chemical agents that impede budding. In case of suitably chosen loading, the vine stocks will not get denser or thicker.

When practicing the inventive process, the plantation can be regularly supplied with phosphate- or potassium-containing fertilizers. Occasionally, as required, fertilizers containing nitrogen or other agents can be applied, and also organic manures, if recommended.

The process according to the invention requires only one wire to be arranged parallel to the vine-stock row. Although this wire is to be considered as being "single," with respect to its function, practically it may be a cable-like wire made of several strands, or several wires arranged directly side by side, depending on loading conditions and purchasing considerations.

In the plantations according to the "G.D.C." and "Duplex" systems, there are two cordon arms and respectively two horizontal wires for supporting the shoots. The desired base form can be developed also with these systems because the distances between the wires allow free hanging down of the shoots.

The inventive viticultural process renders possible to simplify the conventional support systems, to regulate the vintage by mechanical means, to increase the vintage yields, to reduce labor demands, and to use successfully a harvesting device.

As a result of the application of the inventive process, regular manual dressing or pruning can be eliminated, and vine growing can be mechanized essentially in all of its details.

If necessary, growth-impeding agents can be used in the producing plantations to limit the ripening of the shoots to a maximum of 10 to 35 cm on the producing twigs.

The vine-dressing machine according to this invention is suitable for the mechanical dressing of suitably cultivated vines, and for the occasional cutting short of the already produced vine shoots and producing twigs.

It is not necessary to cut back or shorten all the already produced vine shoots and producing twigs by means of the dressing machine. To this end, the cutter of the machine can be lifted or lowered when travelling, depending on the particular terrain involved.

The inventive machine is of a simple design and can be economically manufactured. It carries out the vine dressing excellently, without damaging shoots, vine stocks, or the supporting post system, the vine props, etc. It can be operated independently from or together with other implements, such as shoot breakers or chemical dispersers, etc.

In accordance with these and other objects, the major features of the inventive machine are embodied in that at least one dressing mechanism is provided, connected to a self-propelled tractor and the like and/or a trailer, supported by an arm that can be rotated and tilted, in addition to being adjustable in height, preferably about two axes or center lines that are nearly perpendicular to each other. The arm carries the dressing mechanism which can be mechanical or chemical in its function.

When mechanical, a cutter mechanism is used that preferably consists of a circular saw or blade for shortening or cutting back the already formed vine shoots, producing twigs and/or other vine parts that need to be spaced out.

When the dressing mechanism is for chemical purposes, it is preferably in the form of a spraying or pulverizing attachment with suitable conduits for applying chemicals that impede or retard budding, and/or for retarding blossom growth, thus for controlling the vintage.

From what has been explained so far it will be clear to those skilled in the art that conventional manual "dressing" and "pruning" are eliminated by the inventive process; any subsequent reference to such steps should be understood as relating to the cutting back and shortening of already produced vine shoots, producing twigs, poorly developed and unripe parts, in accordance with the definitions of this invention.

The inventive process and machine will be better understood, with additional objects, major features, operational details and advantages resulting therefrom, when considering the following detailed description, when taken in conjunction with the accompanying drawings, wherein FIG. 1 illustrates, for explanatory purposes, a vine stock during the spring of the first year;

Figures 3, 4:
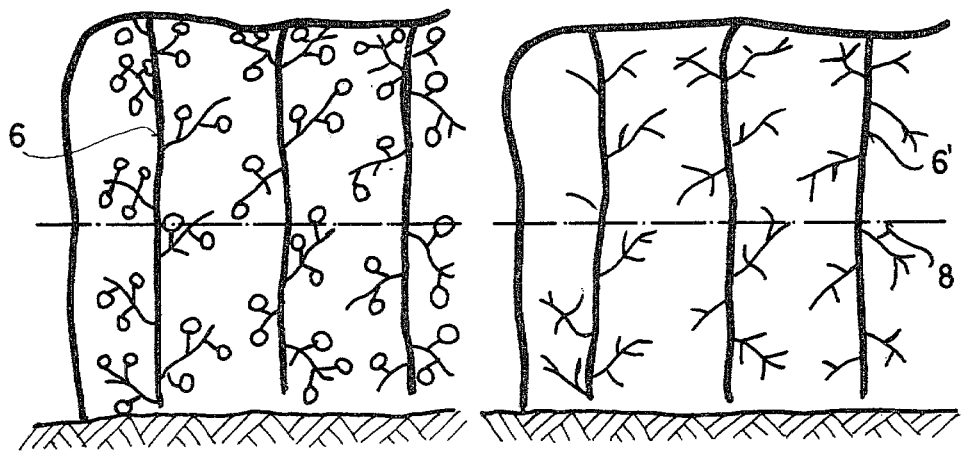
FIG. 3 shows the vine stock of FIG. 2 in the spring of the second year.
Figures 5, 6:
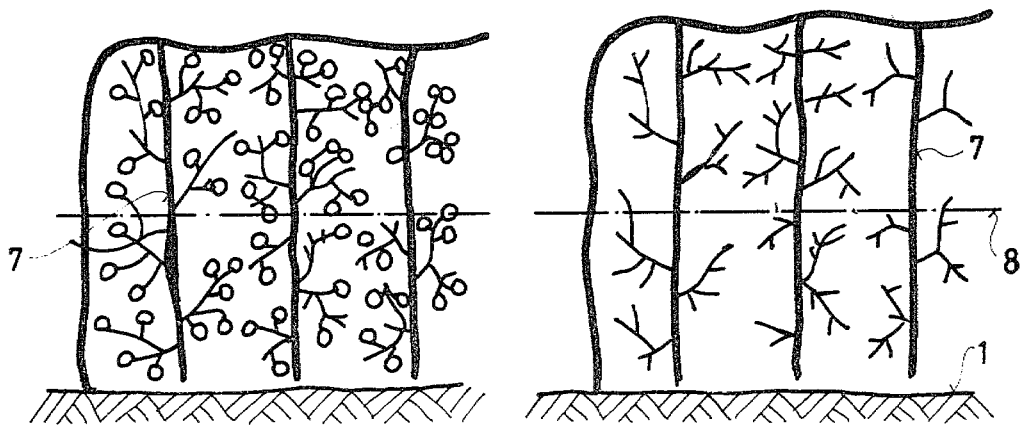
Figure 7:
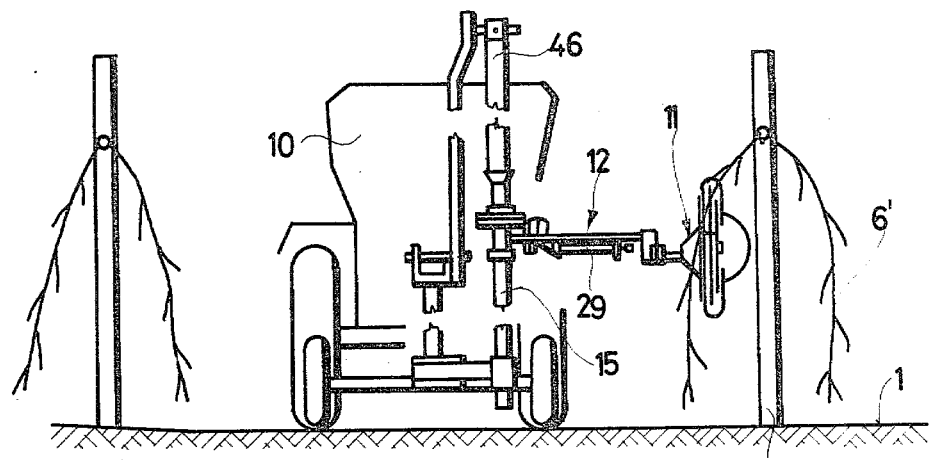
Figure 8:
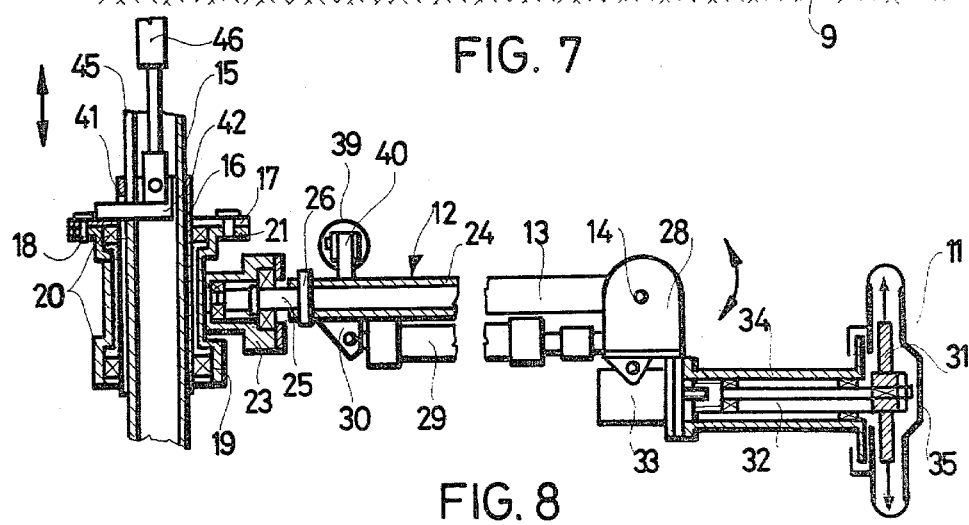
Figure 9:
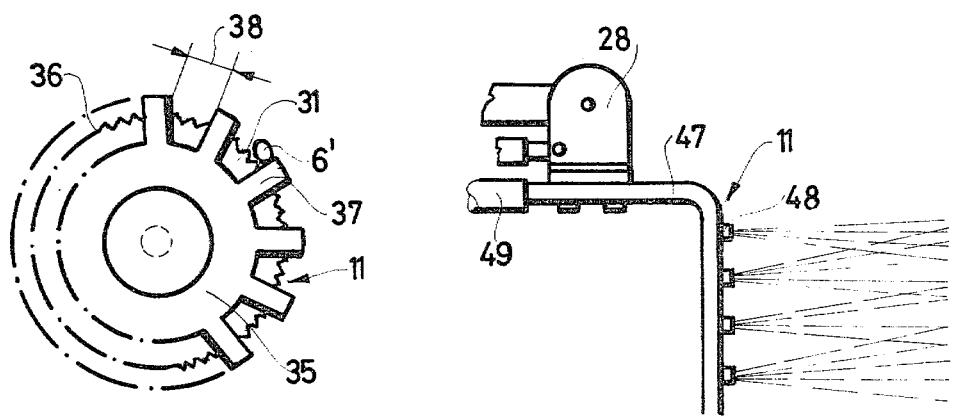
Figure 10:
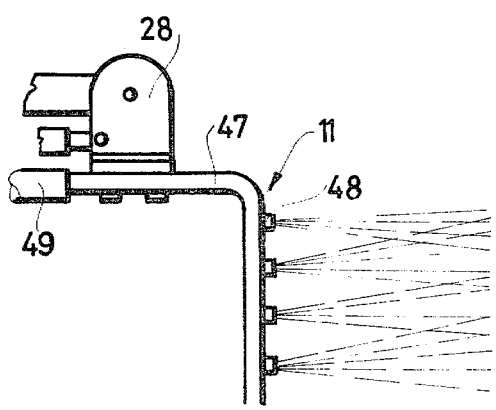

FIG. 4 goes on by illustrating the stock of FIG. 3 after it has lost its foliage in the second year;

FIG. 5 shows the stock of FIG. 4 in the spring of the third year;

FIG. 6 relates to the stock of FIG. 5 in the fall of the third year;

FIG. 7 is an exemplary, somewhat schematic illustration of a vine-dressing machine according to this invention, viewed in the direction of a row of vine stocks;

FIG. 8 is an enlarged, partly sectioned, partial view of the machine according to FIG. 7, the vine stocks and portions on the left-hand side of FIG. 7 having been omitted;

FIG. 9 is a somewhat schematic, frontal view of a mechanical cutting mechanism used in FIG. 8; and FIG. 10 shows a modification, including a pulverizing or spraying attachment adapted in lieu of the cutter mechanism, both being attachable toward a partial showing of the right-hand side of the FIG. 8 illustration.

Before describing the inventive method and machine, explanations will be given in respect of the FIGS. 1 to 6, constituting schematic views of successive vine-stock development stages over three years, taken alternatively in spring and in fall. In these views, numeral 1 constitutes a soil level (applicable to all illustrations 1 to 6); 2 is a "single wire" of the support system; 3 is a cordon arm; 4 is a schematically shown initial shoot; 5 illustrates a vine grown from the shoot; 6 is a developed sprout; 6' denotes a produced sprout; 7 is a bearing twig; and numeral 8 identifies an operational level to which reference will be made later.

It should be added right here that the nomenclature used is somewhat experimental (even in the mother language, Hungarian, of the inventor), and should be construed as explanatory only. The shoots 4 are the plant formations with leaves that are formed during the first year of growth. When foliage is lost, these shoots are transformed, or rather they mature into the vines 5 which are substantially without leaves. These vines are presupposed to hang down, as will be understood from subsequent explanations, during the inventive procedures. After budding, the vines mature into the developed sprouts 6 (we are now at the beginning of the second year). Once foliage has again been lost, these sprouts constitute the produced sprouts numbered 6'. Finally, the next budding turns these latter sprouts into the bearing twigs 7 in the next or third year.

The invention develops the retained, not removed, shoots 4 into producing or bearing bases. In the terminology and according to the concepts of the invention, these shoots 4, that were retained for growing bearing twigs, the vines 5, as well as the initial and produced sprouts 6 and 6', respectively, and of course the bearing twigs 7 themselves, all constitute "producing bases."

The level 8 is imaginary and relates to the height at which (a) the clusters have to be spaced apart after their appearance in the spring of the second year; and/or (b) chemical bud spacing or mechanical dressing is performed in the second year, after the foliage has been lost; further at which (c) the clusters are spaced apart (dressed) once they appear, in each subsequent year, from the third year on; and/or finally (d) again chemical bud spacing or mechanical dressing is to be performed after the leaves have fallen off, in each subsequent year, from the fall of the third year onward.

The location of the level 8 can be selected at will, and the inventive machine allows adjustments within a practical range; thus the degree of shortening the twigs 7 is controllable.

Figures 1, 2:
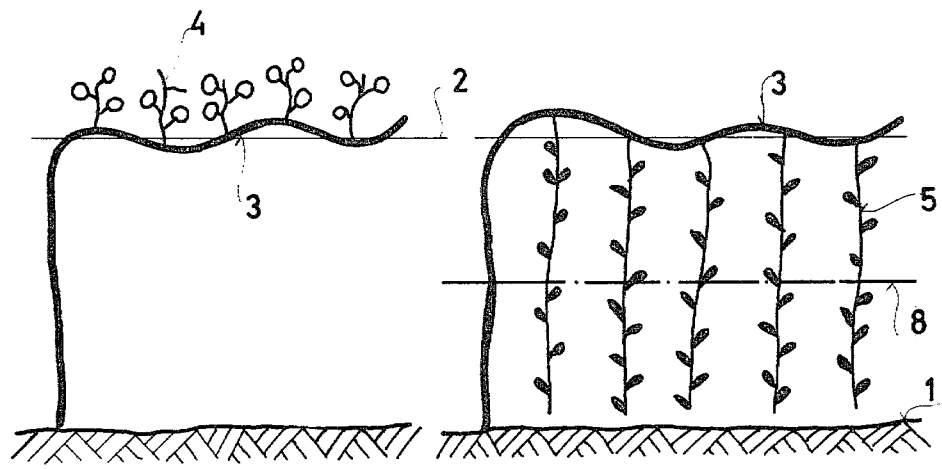
FIG. 2 shows the stock of FIG. 1 in the first year, after the foliage has fallen off.

Once the plantation has been set up, the individual vine stocks are raised. In the first year, the cordon arm 3 is developed along the wire 2, so that the shoots 4 start forming, as illustrated in FIG. 1. The same stock is shown in FIG. 2 after the leaves have fallen off. There are now, for example, five hanging vines 5 which grew out of the five shoots 4. These vines are spaced apart as was explained earlier under a/; in the illustrated example, each other vine is removed, leaving three of them (see FIG. 3 where they become the developed sprouts 6).

We can now observe in FIG. 3 further development of the sprouts 6, in the spring of the second year (it will be clear that successive pairs of figures, such as 1 and 2, 3 and 4, etc., cover two phases of the same year). Once the schematically shown clusters appear, they can be cut or spaced apart, at the chosen level 8, as shown in both FIGS. 3 and 4. In FIG. 4 we refer to the growths as "developed sprouts" 6', at which time (fall of second year) the procedure suggested earlier under (b) should be carried out. The choice of chemical or mechanical procedure depends on what is available.

In FIG. 5, spring of the third year is reached, at which time we already have the bearing twigs 7, constituting the development of the initiated plantation in accordance with the invention. In the spring of each year, from the third onward, the clusters are spaced apart once they appear, as per (c), and later in the fall, and again in subsequent years, chemical spacing or mechanical dressing of the buds is performed, as the case may be, after the leaves have fallen off (see (d) before). The level 8 is again observed for these steps.

It should be noted—as this was expressed by the use of "and/or" between the procedure alternatives (a) and (b), as well as (c) and (d)—that the spring and the fall operations are selective, and do not have to be performed both within the same year, although this is also possible. The conditions of the plantation and of the vine stocks will dictate the best approach, last but not least relying of course on weather and local conditions. It is within the scope of the invention to carry out two steps per year, or only one, and similarly in the years following the third year.

As can be seen from FIG. 7, the vine-dressing machine according to the invention includes a tractor 10 and the like capable of moving along and between the rows of vine stocks, the machine being preferably mounted at the front of the tractor. In the exemplary embodiment, the machine is fitted with a single cutter mechanism 11. A deflecting arm 12 is provided for supporting the mechanism 11 in a manner rotatable and pivotable about respective horizontal and vertical, substantially perpendicular center lines 13, the latter about a pin 14 (see FIG. 8), as related to the arm 12. There are mechanical elements (not shown in detail) for a vertical adjustment of the arm 12, and for tilting the same backwards with respect to the direction in which the tractor and the vine-dressing machine advances (further particulars to follow somewhat later).

In FIG. 7, the earlier-described wire 2 of the support system is also shown, with a post 9 therefor, as well as the soil level 1 and, as a matter of example, one of the produced sprouts 6'. It will be understood that the machine is suitable for being operated in all phases of viticulture, as has been explained earlier under passages (a) through (d), that is, not only for the sprouts but also for dressing, spacing apart or cutting short the clusters, buds and/or other parts of the vine stocks.

From here on, the machine structure will be described primarily with the detailed, somewhat enlarged illustration of FIG. 8 in mind. In a frontal portion of the tractor 10, there is a vertical supporting column 15 that is displaceable in height by the aid of a sliding muff 16. The latter has a disc 17 to which, in the exemplary embodiment, two vertically downwardly directed pins 18 are secured, on either side of the longitudinal axis of the column 15. On the outer mantle of the muff 16, a ferrule 19 is lodged that is rotatable owing to the provision of one or two rows of ball bearings 20 as shown. The top of the ferrule 19 has a disc 21 that has arcuate cut-outs 22 (not shown) for receiving the pins 18. One end of these cut-outs defines the operating position of the cutter mechanism 11 while the other ends of the cut-outs correspond to a rearwardly, deflected condition of the arm 12. A not illustrated, conventional spring mechanism is used to return the arm 12 from the deflected position.

A hub 23 rigidly attached to the ferrule 19 actually carries the arm 12, namely in a pivotable manner about a pin 25 at the inner end of a tubular portion 24 that forms part of the arm 12. A lock pin 26 removably connects the pin 25 to the portion 24. In a manner known per se, the pin 25 is journaled in the hub 23 by means of axial and radial ball bearings.

The outer end of the portion 24 of the arm 12 carries a tilt frame 28 by the intermediary of the pin 14. The cutter mechanism 11 is secured to this frame 28, as shown in FIG. 8 (the alternative spraying attachment of FIG. 10, following the frame 28, will be described later). It will be understood by those skilled in the art that the cutter mechanism of FIGS. 7 to 9, and the spraying attachment of FIG. 10, constitute alternative solutions of dressing means as provided by the invention for the earlier explained purposes.

For accomplishing the tilting of the cutter mechanism 11 about the pin 14, a tilting unit 29 is disposed, preferably below the arm 12 (also identified in FIG. 7) which can be made up of a suitable hydraulic working cylinder as shown. In the drawings, the right-hand end of the unit 29 is attached to the frame 28 while its left-hand end is linked to a bracket and the like 30 that is secured to the tubular arm portion 24.

The cutter mechanism 11 according to the invention can be constituted of a driven, mechanical unit including a saw blade and the like, or a rotating cutter, but can also be substituted by the already mentioned spraying attachment of FIG. 10. Staying for the time being with the exemplary, preferred cutter embodiment shown in FIGS. 7 to 9, a circular saw 31 is used, secured to a shaft 32. The latter is rotatably journaled in a tubular casing 34 and is driven by a hydraulic motor or unit 33 which latter, it should be understood, could be in the form of an electric, pneumatic or other suitable drive. This may be connected with or independent from the tractor mechanism.

The saw 31 has a protective case 35 that surrounds the former as shown, the saw having support fingers 37 in the region of its cutting edge 36, preferably secured in a bridging fashion to the outer periphery of the case 35, the distance between the fingers being uniform and identified by numeral 38 (FIG. 9). The invention also contemplates an arrangement in which this finger distance is adjustable (not shown). The case 35 is rotatable about the shaft 32. The support fingers 37 have a double function. First, the cutting edge 36 of the saw is protected for cases when the same might strike a vine stock or a post; and second, the shoots, vines, sprouts or twigs—in the illustrated case the produced sprout 6' shown—are individually fed toward the saw 31 and supported during the cutting.

In the preferred, exemplary vine-dressing machine the distance 38 between the fingers has been chosen to be about double the contour of the vine part to be removed. This prevents thicker parts to get between the fingers 37. The rotatable arrangement of the case 35 allows the same to roll along the vines.

In the described structure, the cutter mechanism 11 can be pivoted about the pin 14 and immobilized in the chosen position, use being made of the hydraulics of the tilting unit 29. Movement about the center line 13 is solved by applying another, preferably hydraulic working cylinder, shown at 39, having a piston rod that is attached to an ear 40 on the tubular arm portion 24, in a direction perpendicular to the portion 24.

The muff 16, together with the associated arm 12 and cutter 11 (or spraying attachment, as will be understood), is vertically entrainable along the column 15. To this end, an opening 41 is provided in the muff 16, allowing a nose of an entraining member 42 to get caught therein. The member 42 is installed inside the column 15 so that its extension 43, for engagement with the muff 16, can reach out through a vertical cutout 45 in the wall of the column 15, for vertical entrainment of the muff. The member 42 is in operative connection with a third working cylinder 46, schematically shown toward the top of the column structure (also in FIG. 7).

Coming now to the modification shown in FIG. 10, showing only the right-hand end of the structure of FIG. 8, a pulverizing or spraying attachment 47 is secured, alternatively, to the tilt frame 28. The structure essentially consists of an L-shaped, bent pipe that has nozzles 48, preferably only on the vertical limb, as shown. The other, left-hand end of the pipe can have a conduit 49 attached thereto for the supply of chemicals and other required treatment agents.

The distance of the cutter mechanism 11 from the column 15 (and of course also that of the attachment 47 to 49) is adjustable, e.g. by the regulation of the deflecting arm 12 in the horizontal plane. However, the invention also contemplates a solution wherein a telescopic adjustment is provided for the tubular arm portion 24 or some other part.

The operation and suggested application of the inventive vine-dressing machine according to FIGS. 7 to 10 is as follows. The tractor 10 is positioned between the vine-stock rows so that the vine-dressing machine can operate, and its level is then adjusted to the level 8 as this was explained earlier with reference to FIGS. 1 to 6. This done, one brings the cutter mechanism 11 in the desired angular attitude by means of the hydraulic working cylinders 29 and 39; thereafter the sliding muff 16 is vertically adjusted by means of the (third) cylinder 46.

The machine can now be moved between and along the rows of stocks. The hanging, produced sprouts 6' below the cordon wire 2 are supported by the fingers 37, to be removed by the aid of the mechanical cutter mechanism 11. The cutting speed of the circular saw 31 is preferably chosen to be identical with or possibly faster than the advancing speed of the tractor, resulting in destruction-free cutting areas.

If the cutter 11 encounters an obstacle during its advancement, the arm 12 is capable of pivoting in the rearward direction (as compared to the advancing direction). together with the cutter mechanism 11, to be returned somewhat later by the earlier-described restoring spring(s).

If the alternative procedure with the spraying attachment 47 to 49 of FIG. 10 is employed, the difference consists merely in that the sprouts 6' are sprayed below the desired level 8. It is of course possible also with this operation to ensure the guiding of the vines, if required.

Depending on the condition of the plantation, the position of the cutter mechanism or of the spraying attachment (that is, the selectively usable mechanical and chemical dressing mechanisms) can also be regulated during advancement, in one or more of the three possible directions.

It will be appreciated by those skilled in the art that one of the most difficult tasks of viticulture can now be mechanized, with substantial savings, yet producing the same or even better results so far as the vintage is concerned.

It will be understood by those skilled in the art that modifications and changes can be made in both the process and the machine according to the invention, without departing from the spirit and scope thereof.

What I claim is:

1. In a viticulture process comprising growing a grape-vinestock having at least one cordon arm with (a) vine branches depending downwardly therefrom and (b) said cordon arm being supported by a functional wire strung between supporting posts, the improvement which comprises initially growing and training said cordon arm to be supported on a single functional wire, initially cultivating the downwardly depending vine branches to depend freely from said cordon arm and to be spaced about 10 to 30 cm apart and spray dressing the freely downwardly depending vine branches and the growth thereon substantially downwardly from a predetermined level, said predetermined level being intermediate the upper and lower ends of said freely downwardly depending vine branches, for substantially preventing fruit growth in the sprayed areas, thereby causing regulation of high product yield and quality or both, generally from the buds which are on the portion of the freely downwardly depending vine branches which are not subjected to said spray dressing, and thereby eliminating periodic cyclic product variations and permanently maintaining, without cutting, substantially the entire length of each freely downwardly depending vine branch.

2. The process of claim 1 wherein the freely downwardly depending vine branches are about 15–20 cm apart on the cordon arm.

3. The process of claim 1 wherein the cordon arms are at a height of about 140 to 220 cm.

4. The process of claim 1 wherein said single functional wire is substantially parallel to the ground and to the rows of vines.

5. The process of claim 1 wherein the mechanical spray dressing is accomplished with a grape bunch thinning chemical.

6. The process of claim 1 wherein said spraying is accomplished by causing a chemical to be sprayed out of a spray device adjustably attached on a mobile vehicle.

* * * * *